(12) United States Patent
He et al.

(10) Patent No.: US 10,926,307 B1
(45) Date of Patent: Feb. 23, 2021

(54) POLLUTED SITE BY THERMAL DECOMPOSITION AT NORMAL TEMPERATURE COMBINED WITH BIOLOGICAL HEAP

(71) Applicant: CHINESE RESEARCH ACADEMY OF ENVIRONMENTAL SCIENCES, Beijing (CN)

(72) Inventors: Xiaosong He, Beijing (CN); Beidou Xi, Beijing (CN); Yiming Zheng, Beijing (CN); Guangchun Shan, Beijing (CN); Hangzheng Zhao, Beijing (CN); Hongbao Liu, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 0 days.

(21) Appl. No.: 16/840,352

(22) Filed: Apr. 4, 2020

(30) Foreign Application Priority Data

Dec. 18, 2019 (CN) .......................... 201911312710.7

(51) Int. Cl.
| | |
|---|---|
| *B09C 1/00* | (2006.01) |
| *B09C 1/06* | (2006.01) |
| *B09C 1/10* | (2006.01) |
| B09C 1/08 | (2006.01) |
| A01G 9/14 | (2006.01) |

(52) U.S. Cl.
CPC .................. *B09C 1/06* (2013.01); *B09C 1/10* (2013.01); *A01G 9/14* (2013.01); *B09C 1/08* (2013.01)

(58) Field of Classification Search
CPC ................................... B09C 1/06; B09C 1/10
See application file for complete search history.

(56) References Cited

U.S. PATENT DOCUMENTS

| | | | | |
|---|---|---|---|---|
| 5,232,596 A | * | 8/1993 | Castaldi | C12R 1/38 210/603 |
| 5,362,397 A | * | 11/1994 | Cyr | C02F 3/04 210/610 |
| 2002/0187545 A1 | * | 12/2002 | Calcavecchio | B09C 1/10 435/262 |
| 2003/0073877 A1 | * | 4/2003 | Yen | B09C 1/10 588/318 |

FOREIGN PATENT DOCUMENTS

| | | | |
|---|---|---|---|
| CN | 110314930 | * | 10/2018 |
| CN | 209272122 | * | 10/2019 |

\* cited by examiner

*Primary Examiner* — Janine M Kreck
(74) *Attorney, Agent, or Firm* — CBM Patent Consulting, LLC (57) ABSTRACT

A method for repairing an organic polluted site includes the following steps: step 1, build a sunlight greenhouse; step 2, carry out pretreatment to the soil of the organic polluted site; step 3, perform a biological heap treatment on the pretreated soil; step 4, implement quality control on the biological heap for soil remediation. By constructing a sunlight greenhouse within the original site of organic pollution sites, placing a biological heap in the sunlight greenhouse for a biological heap treatment, using the heat accumulated in the sunlight greenhouse to promote the volatilization of volatile organic matters in the soil without causing secondary pollution, and meanwhile adding a microbial agent and a nutritional agent to the polluted soil to promote the degradation and conversion of adsorbed organic matters.

11 Claims, 8 Drawing Sheets

POLLUTED SITE BY THERMAL DECOMPOSITION AT NORMAL TEMPERATURE COMBINED WITH BIOLOGICAL HEAP

This application claims priority to Chinese Patent Application Ser. No. CN2019113127107 filed on 18 Dec. 2019.

TECHNICAL FIELD

The invention relates to the technical field of soil remediation, and particularly relates to a method for strengthening repair of organic polluted site by thermal decomposition at normal temperature combined with biological heap.

BACKGROUND ART

Organic pollution of the soil is caused by human-induced leakage during the process of mining, transportation, processing, and storage. It changes the physical and chemical properties of the soil and the structure of the biological community. It enters the biosphere through enrichment, and causes stress to the life of people, animals and plants. Most of China's chemical plants were built from the early days of the founding of the People's Republic of China to the early stage of reform and opening up. Limited by the technical conditions at that time and years of disrepair, the leakage of drainage and oil pipelines was serious. In recent years, due to the relocation of chemical companies, the organic pollutants in the soil of the remaining sites have seriously exceeded the standard, which has affected the secondary development and utilization of the land. Therefore, site pollution remediation is imminent.

In the prior art, physical methods (gas phase extraction, soil exchange method), chemical methods (advanced oxidation, leaching), and biological methods (biological stimulation, biological strengthening) are mainly used to repair organic contaminated soil. These methods either have low removal effects, or have high costs, long cycles, and severe trailing phenomenon.

At present, the biological heap treatment method has become a new type of organic polluted soil remediation method, which mainly creates a relatively superior environment for microorganisms by adding chemicals, and the microorganisms uses organic pollutants as a carbon source, thereby achieving the purpose of removing organic pollutants. However, the biological heap is generally treated in the open air, and volatile organic matters are likely to cause pollution to the atmospheric environment. In the process of open-air biological heap, the microbial degradation activity and the migration of organic matters are greatly affected by weather changes, and the removal efficiency is low. In addition, the area of organic pollution sites in China is relatively large, there are many polluted soil points, the cost of ex situ repair and transportation is high, and it is easy to cause secondary pollution during transportation.

Therefore, it is necessary to provide a fast, effective, low-cost method for removing organic pollutants in soil without secondary pollution.

Contents of the Invention

In order to overcome the above problems, the present inventors have conducted intensive studies, and found that: build a sunlight greenhouse at the original site of organic polluted soil, place a biological heap in the sunlight greenhouse, use the heat accumulated in the sunlight greenhouse to promote the volatilization of soil organic matters without causing secondary pollution, and meanwhile add a microbial agent and a nutritional agent to the polluted soil to promote the degradation and conversion of adsorbed organic matters, thereby completing the present invention.

Specifically, the object of the present invention is to provide a method for repairing an organic polluted site, wherein, said method includes the following steps:

step 1, build a sunlight greenhouse;
step 2, carry out pretreatment to the soil of the organic polluted site;
step 3, perform a biological heap treatment on the pretreated soil;
step 4, implement quality control on the biological heap for soil remediation.

Wherein, in step 1, said sunlight greenhouse includes a five-sided transparent air supporting membrane structure unit 1 with a steel structure frame, a gas collection unit 2 and a detection unit 4 located inside the greenhouse, and an exhaust gas treatment unit 3 located outside the greenhouse.

Wherein, said gas collection unit 2 is disposed on the top of the inner wall of the air supporting membrane structure unit 1 to collect pollutants in the sunlight greenhouse, and said gas collection unit 2 includes an induced draft fan and a gas collection pipe connected in this order.

Wherein, the gas collection unit is turned on for 0.5 to 1 hour every day during the period of 12:00 to 15:30, preferably during the period of 13:00 to 14:00, to suck out the volatile organic matters in the greenhouse and treated with activated carbon adsorption.

Wherein, said pretreatment includes the steps of sieving, removing impurities, adjusting the concentration, and adding a pro-degradation agent to the soil of the organic polluted site.

Wherein, said adjusting the concentration refers to adjusting the concentration of the pollutants in the soil to be not higher than 60,000 mg/kg.

Wherein, said pro-degradation agent includes a microbial agent and a nutritional agent,
said microbial agent is a bacterial agent with an ability of organic matter degradation, and
said nutritional agent is poultry and animal feces and/or urea, and the stacking time of said poultry and animal feces does not exceed 72 hours. Wherein, based on 100 parts by weight of the soil of the organic polluted site, the amount of microbial agent added is 0.3 to 2.0 parts by weight, and the amount of nutritional agent added is 0.4 to 1.8 parts by weight.

Wherein, in step 2, carry out pretreatment to the soil of the organic polluted site further includes adjusting the moisture content of the soil.

Wherein, in step 4, said quality control includes the following steps:

step 4-1, scrape the dried surface soil of the original biological heap every 1-3 days to form a new biological heap;

step 4-2, supplement water to the new biological heap, adjust the moisture content, and perform biological fermentation;

preferably, when the accumulated temperature in the sunlight greenhouse from 8:00 to 20:00 is lower than 420° C., scrape the surface soil of the original biological heap every 2 to 3 days;

when the accumulated temperature in the sunlight greenhouse from 8:00 to 20:00 is higher than or equal to 420° C., scrape the surface soil of the original biological heap once a day.

The beneficial effects of the present invention include:

(1) According to the method for repairing an organic polluted site provided by the present invention, the heat accumulated by the air supporting membrane structure unit in the sunlight greenhouse can increase the gas phase mass transfer of volatile organic matters on the one hand, and promote the desorption of adsorbed organic pollutants on the other hand, making them free and improving their mobility;

(2) According to the method for repairing an organic polluted site provided by the present invention, the operation of the exhaust gas treatment unit avoids secondary pollution caused by volatile organic matters and flying dust when turning over the biological heap;

(3) According to the method for repairing an organic polluted site provided by the present invention, the high-temperature enhanced biological heap improves the activity of microorganisms and the effect of organic matter degradation;

(4) According to the method for repairing an organic polluted site provided by the present invention, the added microbial agent is obtained by domestication and separation from the contaminated groundwater of the polluted site, and the adaptation period of which is short;

(5) According to the method for repairing an organic polluted site provided by the present invention, the water source for supplementing the water to the biological heap is taken from unpolluted water, and the disturbance to the living environment of soil microorganisms is small;

(6) According to the method for repairing an organic polluted site provided by the present invention, the soil 2 to 7 cm deep from the surface layer of the original biological heap is scraped to form a new biological heap for biodegradation, and the different removal methods used for volatile organic matters and adsorbed organic matters make the removal efficiency high.

DESCRIPTION OF THE REFERENCE SIGNS

1—air supporting membrane structure unit;
2—gas collection unit;
3—exhaust gas treatment unit;
4—detection unit.

SPECIFIC EMBODIMENTS FOR CARRYING OUT THE INVENTION

The present invention will be further described in more detail through preferred embodiments and examples. Through these descriptions, the features and advantages of the present invention will become clearer.

The term "exemplary" as used herein is intended to be "serving as an example, an illustrative embodiment, or an embodiment". Any of the embodiments described herein as "exemplary" need not be construed as preferred as or better than other embodiments.

The present invention provides a method for repairing an organic polluted site, said method includes the following steps:

step 1, build a sunlight greenhouse;

step 2, carry out pretreatment to the soil of the organic polluted site;

step 3, perform a biological heap treatment on the pretreated soil;

step 4, implement quality control on the biological heap for soil remediation.

The method of the present invention is further described below:

Step 1, Build a Sunlight Greenhouse.

The present inventors have researched and found that, compared with ex situ repair, the cost of original site repair is lower, the impact on the environment is smaller, and secondary pollution during transportation will not occur. Therefore, in the present invention, it is preferable to build a sunlight greenhouse at the original site in order to achieve the original site remediation of organic polluted site.

Figure 1:
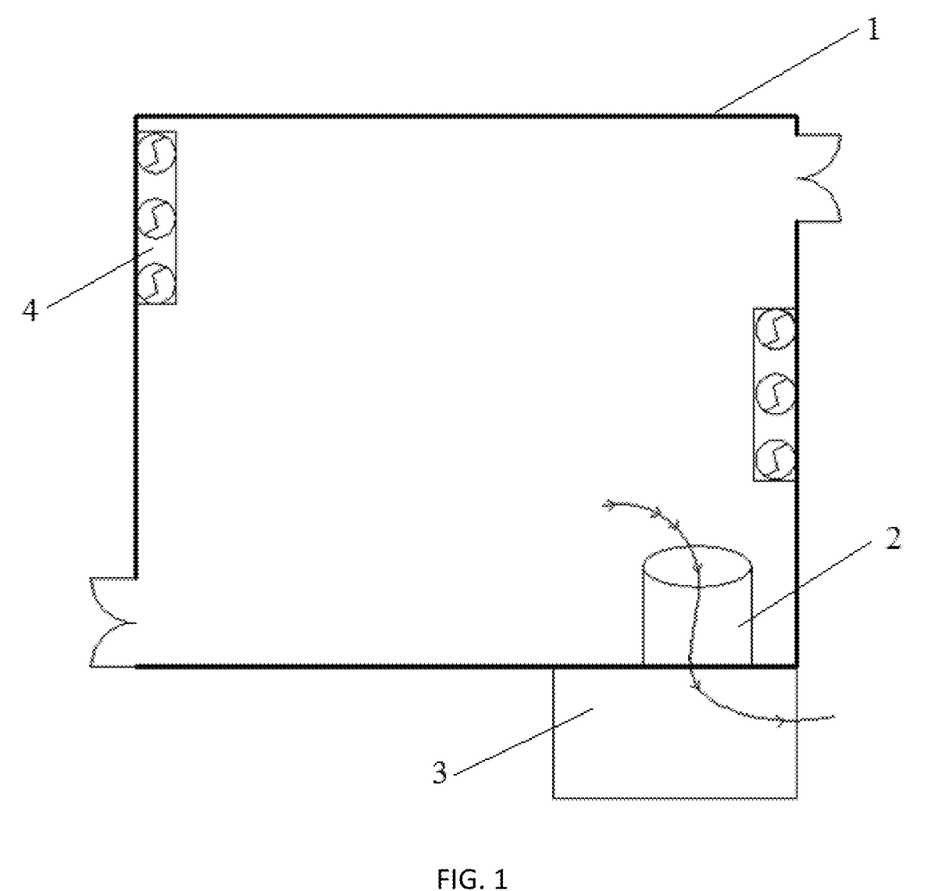
FIG. 1 shows a schematic top view of a sunlight greenhouse according to a preferred embodiment of the present invention.

According to a preferred embodiment of the present invention, as shown in FIG. 1, the sunlight greenhouse includes an air supporting membrane structure unit 1, a gas collection unit 2, an exhaust gas treatment unit 3, and a detection unit 4, wherein, the gas collection unit 2 and the detection unit 4 are disposed inside the air supporting membrane structure unit 1, said exhaust gas treatment unit 3 is connected to the gas collection unit 2 and is disposed outside the air supporting membrane structure unit 1.

In a further preferred embodiment, said air supporting membrane structure unit 1 includes a rectangular steel structure frame, the bottom surface of which is a hardened floor, and the remaining five surfaces are made of a light-transmitting material.

Wherein, said light-transmitting material includes, but is not limited to, glass fiber reinforced plastic, transparent plastic film, and transparent glass. Said air supporting membrane structure unit can collect solar energy, so that the temperature in the sunlight greenhouse increases.

The present inventors have researched and found that the air supporting membrane structure unit constitutes the main body of the sunlight greenhouse, and the closed area formed by which can maintain the indoor temperature of the greenhouse during the process of the biological heap, which is beneficial to increase the vapor pressure of organic pollutants in the soil. The heat accumulated by the air supporting membrane structure unit can increase the gas phase mass transfer of volatile organic matters on the one hand, and can promote the desorption of adsorbed organic pollutants, make them into a free state, provide mobility, and significantly improve the removal efficiency on the other hand. Moreover, the high temperature in the greenhouse is conducive to the rapid heating and drying of the surface soil of the biological heap, and the low moisture content promotes the accelerated volatilization of volatile organic matters.

According to a preferred embodiment of the present invention, said gas collection unit 2 is disposed on the top of the inner wall of the air supporting membrane structure unit 1 to collect pollutants in the sunlight greenhouse.

Said gas collection unit 2 includes an induced draft fan and a gas collection pipe connected in this order.

In the present invention, by providing a gas collection unit, the volatile organic matters in the closed area can be effectively collected and sucked, which improves the soil-gas organic pollutant concentration difference and promotes the soil-gas mass transfer of organic pollutants. Specifically, the air supporting membrane structure unit increases the temperature in the sunlight greenhouse, which breaks the chemical bond between the organic pollutant molecules and the soil particles, resulting in an increase in the concentration of organic matters in the soil gas, while the concentration of organic matters in the air is kept at a low level by the function of the gas collection unit. The concentration difference between soil gas and air promotes the movement of organic molecules from soil gas to the air.

In a further preferred embodiment, when the concentration of volatile organic matters inside the air supporting membrane structure unit reaches 100 ppm, the gas collection unit starts to operate.

When the concentration of volatile organic matters inside the air supporting membrane structure unit is lower than 100 ppm, the gas collection unit stops operating.

In a more further preferred embodiment, the gas collection unit is turned on for 0.5 to 1 hour every day during the period of 12:00 to 15:30, and preferably the gas collection unit is turned on for 0.5 to 1 hour every day during the period of 13:00 to 14:00 to suck out the volatile organic matters in the sunlight greenhouse.

Wherein, the volatile organic matters discharged by suction are preferably treated with activated carbon adsorption.

Further, after the gas collection unit is turned on for 0.5 to 1 hour, manual operations are performed to scrape the surface soil of the biological heap.

In the present invention, for a 50 m×25 m×5 m air supporting membrane structure unit, when the power of the induced draft fan is 5.5 kw and the air extraction volume is 7000 m$^3$/h, the effect of sucking the volatile organic matters is the best, and the effect of promoting soil-gas mass transfer of organic pollutants is the best.

According to a preferred embodiment of the present invention, said exhaust gas treatment unit 3 is connected to the gas collection unit through a gas collection pipe, and includes a dust removal device and an adsorption device to prevent secondary pollution.

In the present invention, the use of the exhaust gas treatment unit can effectively remove the flying dust and volatile organic matters generated when turning over the biological heap, thereby avoiding secondary pollution.

Wherein, said dust removal device is preferably a dust collector commonly used in the prior art, and said adsorption device is preferably an activated carbon adsorption device, so as to efficiently adsorb volatile organic pollutants.

According to a preferred embodiment of the present invention, there is a plurality of detection units 4, which are all disposed inside the air supporting membrane structure unit to monitor the concentration of volatile organic pollutants in the air supporting membrane structure unit in real time.

Wherein, said detection unit is preferably a PID detector and a flammable gas alarm, such as a fixed PID detector and a wall-mounted flammable gas alarm, which are arranged on the top and side walls of the air supporting membrane structure unit to accurately detect the concentration of volatile organic matters in a closed area and can ensure the safety of the operator.

The inventor found that constructing a sunlight greenhouse at the original site of organic polluted soil and placing the biological heap in the sunlight greenhouse can not only improve the degradation efficiency of the biological heap, but also avoid the pollution of the atmospheric environment by volatile organic matters. It also protected the process of remediation of organic polluted soil from environmental influences.

Step 2, Carry Out Pretreatment to the Soil of the Organic Polluted Site.

According to a preferred embodiment of the present invention, said pretreatment includes the steps of sieving, removing impurities, adjusting the concentration, and adding a pro-degradation agent to the soil of the organic polluted site.

Wherein, the soil to be treated is dug out and sieved. Said sieving refers to sieving the soil of the organic polluted site through a 2 mm sieve, and said removing impurities refers to removing weeds, stones, and the like in the soil. In a further preferred embodiment, said adjusting the concentration refers to adjusting the concentration of the pollutants in the soil to be not higher than 60,000 mg/kg.

Wherein, sample the soil of the organic polluted site and determine the concentration of the pollutants in the soil. If the concentration of the pollutants in the soil is higher than 60,000 mg/kg, mix it with the soil with low pollutants concentration in the site and adjust the concentration to the required range.

According to a preferred embodiment of the present invention, said pro-degradation agent includes a microbial agent and a nutritional agent, wherein, said microbial agent is a bacterial agent with an ability of organic matter degradation, and is preferably a microbial agent separated from contaminated groundwater.

The present inventors have researched and found that adding an exogenous bacterial agent to the biological heap, the bioremediation cycle is longer due to the need for the exogenous bacterial agent to adapt to the environment, which affects the degradation and repair efficiency. Therefore, in the present invention, it is preferable to add a microbial agent separated from the contaminated groundwater of the site to the organic polluted soil to shorten the adaptation period of the microorganisms and improve the degradation and repair efficiency. In a further preferred embodiment, said microbial agent is prepared by a method including the following steps:

Step i, take the contaminated groundwater of the site and cultivate single colonies.

Specifically, take the contaminated groundwater of the site and dilute it 10 times, $10^2$ times, $10^3$ times, $10^4$ times, and $10^5$ times, respectively. Place undiluted raw water and water diluted by the above multiples in different test tubes respectively, take 100 μL each of them and smear them on the plate culture medium, and then cultured in a 37° C. incubator until single large colonies that are clearly visible, regular edges, and large and round are grown. Take the single colonies and streak them on the slanted culture medium to obtain single colonies.

Step ii, screen the cultured single colonies, and a strain with high degradation rate is obtained.

In the present invention, the single colonies cultured in step i are singled out and cultured in a seed culture medium, said seed culture medium is made of components including the followings that are measured in parts by weight:
soybean meal 50 parts
corn starch 10-30 parts
light calcium carbonate 2-6 parts
ammonium sulfate 0.5-2 parts
corn slurry 1.5-4 parts Preferably, said seed culture medium is made of components including the followings that are measured in parts by weight:
soybean meal 50 parts
corn starch 15-25 parts
light calcium carbonate 3-5 parts
ammonium sulfate 0.5-1.5 parts
corn slurry 2-3 parts Further preferably, said seed culture medium is made of components including the followings that are measured in parts by weight:
soybean meal 50 parts
corn starch 20 parts
light calcium carbonate 4 parts
ammonium sulfate 1 part
corn slurry 2.5 parts For example, the components of said seed culture medium are: 50 g/L of soybean meal, 20 g/L of corn starch, 4 g/L of light calcium carbonate, 1 g/L of ammonium sulfate, and 2.5 g/L of corn slurry.

The present inventors have researched and found that the use of the seed culture medium of the above components can accelerate the culture speed of the colonies.

According to a preferred embodiment of the present invention, when the above-mentioned colonies are respectively cultured in the seed culture medium to an OD600 of 0.6 to 0.8, they are transferred to a fermentation culture medium.

Preferably, take 1 mL of the seed culture medium and transfer to the fermentation culture medium.

Further, said fermentation culture medium is made of components including the followings that are measured in parts by weight:
soybean meal 90 parts
starch 30-50 parts
calcium carbonate 3-5 parts
ammonium sulfate 0.4-1.0 part
peptone 5-15 parts Preferably, said fermentation culture medium is made of components including the followings that are measured in parts by weight:
soybean meal 90 parts
starch 35-45 parts
calcium carbonate 3.5-4.5 parts
ammonium sulfate 0.5-0.9 parts
peptone 7-12 parts More preferably, said fermentation culture medium is made of components including the followings that are measured in parts by weight:
soybean meal 90 parts
starch 40 parts
calcium carbonate 4 parts
ammonium sulfate 0.7 parts
peptone 10 parts For example, the components of said fermentation culture medium are: 90 g/L of soybean meal, 40 g/L of starch, 4 g/L of calcium carbonate, 0.7 g/L of ammonium sulfate, 10 g/L of peptone.

Furthermore, the fermentation culture medium further includes a pollutant, said pollutant is the contaminated groundwater of the site, and the concentration of the pollutant in the fermentation culture medium is 50,000 mg/kg-60000 mg/kg.

In the present invention, after the bacterial solution is cultured in the fermentation medium for a period of time, the content of the pollutants in the culture medium is measured, and the strain with the highest degradation rate of the pollutants is screened.

Step iii, expand the culture of the screened strain, and dry to obtain said microbial agent.

Wherein, the strain with the highest degradation rate obtained by screening is expanded for cultivation, and the method commonly used in the prior art is adopted. Specifically, the strain obtained in step ii is placed in a 50 L fermentor to expand the cultivation, and the culture medium has the same components as the fermentation culture medium, but without the addition of the pollutant, and then culture at 15~20° C. for 25—35 h, such as 30 h to further obtain said microbial agent.

The present inventors have researched and found that the microbial agent prepared by the above method can significantly improve the repair efficiency when added to the organic polluted soil to be repaired, which is mainly because the prepared microbial agent has high activity, high adaptability and short adaptation cycle to the soil.

In the present invention, said nutritional agent is poultry and animal feces and/or urea. Preferably, said nutritional agent includes, but is not limited to, cow dung, chicken dung, pig dung, and urea. More preferably, said nutritional agent is selected from one or more of cow dung, chicken dung, pig dung and urea.

According to a preferred embodiment of the present invention, the stacking time of said poultry and animal feces does not exceed 72 hours, and preferably does not exceed 48 hours.

Wherein, the stacking time is calculated from the time when the feces are separated from the poultry and animal. The present inventors have researched and found that the use of fresh cow dung (stacking no more than 72 hours, and preferably no more than 48 hours) as a nutritional agent can significantly increase the types and number of microorganisms in the soil to be repaired while increasing the nutrition, thereby improving the degradation efficiency of pollutants.

According to a preferred embodiment of the present invention, based on 100 parts by weight of the soil of the organic polluted site, the amount of microbial agent added is 0.3 to 2.0 parts by weight, and the amount of nutritional agent added is 0.4 to 1.8 parts by weight, so that the carbon-nitrogen ratio in the soil reaches 20% to 40%.

Preferably, based on 100 parts by weight of the soil of the organic polluted site, the amount of microbial agent added is 0.4 to 1.8 parts by weight, and the amount of nutritional agent added is 0.4 to 1.7 parts by weight, so that the carbon-nitrogen ratio in the soil reaches 22% to 38%.

More preferably, based on 100 parts by weight of the soil of the organic polluted site, the amount of microbial agent added is 0.5 to 1.5 parts by weight, and the amount of nutritional agent added is 0.5 to 1.5 parts by weight, so that the carbon-nitrogen ratio in the soil reaches 25% to 35%.

Wherein, the carbon-nitrogen ratio in the soil is adjusted by adding a nutritional agent, and based on 100 parts by weight of the soil, adding the nutritional agent with the above-mentioned weight ratio can make the carbon-nitrogen ratio in the soil reach 25% to 35%.

The inventors have researched and found that when the microbial agent and the nutritional agent are added in the above ratio, the degradation efficiency of the organic matters in the soil is the highest. When based on 100 parts by weight of the soil of the organic polluted site, and the amount of microbial agent added is less than 0.5 parts by weight, the microorganisms cannot form a large-scale, making it unable to become a dominant species in the soil environment and fail to degrade organic matters well. When the amount of the microbial agent added is higher than 1.5 parts by weight, the microbial species in the soil environment will be singular while increasing the cost, causing the imbalance of the soil environment ecosystem after repair. When based on 100 parts by weight of the soil of the organic polluted site, the amount of the microbial agent added is less than 0.5 parts by weight or higher than 1.5 parts by weight, the carbon-nitrogen ratio will be imbalanced, resulting in low survival activity of the microorganisms.

The present inventors have researched and found that most of the current soil pollution is point source pollution, and the heterogeneity of pollutants makes it difficult to determine the amount of auxiliary materials and microbial agent of the biological heap. In the present invention, it is preferable to carry out pretreatment to the polluted soil, which is conducive to accurately controlling the added amount of the pro-degradation agent, so that the degradation is more efficient, and no waste of resources is caused.

According to a preferred embodiment of the present invention, carry out pretreatment to the soil of the organic polluted site further includes adjusting the moisture content of the soil. Said moisture content is 18% to 30%, and preferably 20%.

Wherein, adding water to the soil can not only increase the activity of microbial agent to promote the degradation process, but also increase the temperature difference between the soil of the biological heap and the sunlight greenhouse, thereby promoting the migration of organic matters. In the present invention, it is preferable to adjust the moisture content by using uncontaminated groundwater near the polluted soil site to ensure that the disturbance to the living environment of microorganisms in the soil is small.

The present inventors have researched and found that when the moisture content of the soil is controlled to be 18% to 30%, preferably 20%, the removal speed and removal rate of organic pollutants in the soil are the highest. When the moisture content is too low (less than 18%) or too high (more than 30%), they both cause microorganisms to be difficult to survive and have low activity, which is not conducive to the degradation of organic matters in the soil.

Step 3, Perform a Biological Heap Treatment on the Pretreated Soil.

In the present invention, the pretreated soil is stacked into a strip shape or a cone shape in a sunlight greenhouse, preferably a strip shape, and the temperature change of the heap body is recorded during the process of the biological heap. At the same time, samples are taken to test the concentration of organic pollutants during the heating period, high temperature period, and cooling period to analyze the degradation rate of pollutants in different periods. Among them, if the total length of a period exceeds 10 days, two samples are needed to be tested.

Step 4, Implement Quality Control on the Biological Heap for Soil Remediation.

During the process of the biological heap, said quality control includes the following steps:

Step 4-1, scrape the surface soil of the original biological heap every 1~3 days to form a new biological heap.

In the present invention, said soil remediation is performed in summer, and is preferably performed under the condition that the average daily temperature is 25° C. or higher.

According to a preferred embodiment of the present invention, soil that is 2 to 7 cm deep from the surface layer of the original biological heap is scraped off every 1~3 days to form a new biological heap.

Preferably, soil that is 4 to 5 cm deep from the surface layer of the original biological heap is scraped off.

The present inventors have researched and found through a large number of studies that soil that is 2 to 7 cm deep from the surface layer of the original biological heap, preferably soil that is 4 to 5 cm deep from the surface layer of the original biological heap can be affected by room temperature. The volatile organic matters therein can produce the maximum degree of migration under the dual effects of temperature rise in the sunlight greenhouse and the increasing in concentration difference of the soil-gas organic matters by the gas collection unit. Therefore, in the present invention, it is preferable to scrape the soil in the above range every 1 to 3 days, and mix the scraped soil to form a new biological heap until the original biological heap is completely scraped off. That is, the volatile organic matters in the biological heap are fully and comprehensively removed.

According to a preferred embodiment of the present invention, when the accumulated temperature in the sunlight greenhouse is lower than 420° C., scrape the surface soil of the original biological heap every 2 to 3 days.

When the accumulated temperature in the sunlight greenhouse is higher than or equal to 420° C., scrape the surface soil of the original biological heap once a day.

Wherein, said accumulated temperature refers to the sum of the average temperature of each hour in the 12 hours from 8:00 to 20:00 in the sunlight greenhouse.

The present inventors have researched and found that using different scraping frequencies in different accumulated temperature ranges is beneficial to improve the removal rate of organic pollutants.

In the present invention, soil remediation is carried out under the condition that the average daily temperature in summer is above 25° C., and the scraping frequency of surface soil is different under different accumulated temperature conditions, this is mainly because the surface soil of the biological heap is greatly affected by the temperature in the sunlight greenhouse. With the increase of the temperature in the sunlight greenhouse, the speed of drying and heating of the surface soil is accelerated, which can promote the volatilization and removal of organic pollutants in the soil.

Further, the scraping of the surface soil of the original biological heap is performed before sunrise or after sunset, preferably after sunset.

According to a preferred embodiment of the present invention, after scraping the surface soil, turn over the original biological heap and the new biological heap. Specifically, turn over the original biological heap, increase its air permeability and adjust the biological heap to maintain the original length and width, promote the volatilization of organic pollutants in the remaining soil, and continue to scrape the surface soil of the original biological heap, until all the soil of the original biological heap is scraped off.

Wherein, it is preferable that the original biological heap and the new biological heap are turned over every day, and the turning over time is after the surface soil is scraped off, and the scraped soil is added to the new biological heap. The turning over is preferably performed by using a turning-over machine. During the turning over process, the gas collection unit and the exhaust gas treatment unit are kept running to avoid secondary pollution caused by flying dust. Step 4-2, supplement water to the new biological heap, adjust the moisture content, and perform biological fermentation.

Wherein, it is preferable to supplement water to the new biological heap every day, and the method of water supplement is preferably spraying with a sprayer during turning over.

Specifically, spray water to the new biological heap formed by the scraped soil daily to adjust the soil to saturated moisture content, preferably adjust the soil moisture content to 18~30%, and more preferably use uncontaminated groundwater near the polluted soil site to adjust the moisture content in order to avoid causing great disturbance to the living environment of the microorganisms in the soil, and then turn over after water supplement.

After the treatment of the above steps, it can be considered that the volatile organic matters have been removed from the new biological heap in this step, and the biodegradation is needed to be performed to remove the adsorbed organic matters. The increased in temperature in the sunlight greenhouse will also cause desorption of the organic matters adsorbed on the secondary clay minerals and in the soil, thus becoming a free state or a volatile state with strong mobility, and being removed from the soil under the effect of gradient forces.

In the present invention, different removal methods are used for different forms of organic matters, that is, a method of periodically scraping the surface soil of the biological heap is used for volatile organic matters, and a method of biodegradation is used for adsorbed organic matters. The two methods work synergistically, and significantly improve the removal efficiency.

According to a preferred embodiment of the present invention, in order to improve the efficiency of soil remediation and use the energy rationally, it is provided that the gas collection unit starts to operate when the concentration of the volatile organic matters in the sunlight greenhouse reaches 100 ppm.

When the concentration of volatile organic matters in the sunlight greenhouse is lower than 100 ppm, the gas collection unit stops operating.

Further, the gas collection unit is turned on in two time periods.

The first opening time period is the time period with the highest temperature in the sunlight greenhouse every day, preferably 12:00~15:30 every day, more preferably 13:00~14:00 every day, and the opening time is 0.5~1 hour.

The second opening time period is 0.5~1 hour before each manual operation to scrape the surface soil of the original biological heap.

Wherein, after the volatile organic matters are sucked out, activated carbon adsorption treatment is preferably adopted to prevent atmosphere pollution.

Since the higher the temperature in the sunlight greenhouse, the faster the volatilization rate of the organic matters in the soil, therefore, in the present invention, it is preferable to turn on the gas collection unit and the exhaust gas treatment unit during the highest temperature period in the sunlight greenhouse every day, which not only improves the concentration difference of the soil-gas organic pollutants, thus promoting soil-gas mass transfer of organic pollutants, but also prevents the equipment from running all the time and reduces energy consumption.

In addition, in order to ensure the safety of the operator, it is preferable to turn on the gas collection unit and the exhaust gas treatment unit before scraping the soil to reduce the concentration of organic pollutants in the sunlight greenhouse. The method for repairing an organic polluted site according to the present invention strengthens the repair of organic pollution by means of normal temperature thermal decomposition combined with a biological heap. The sunlight greenhouse collects solar energy through air supporting membrane structure unit, the temperature rise in the sunlight greenhouse causes the temperature of the biological heap surface soil to rise, and in addition to the increase concentration difference of the soil-gas organic matters caused by the operation of the gas collection unit, the two synergistically promote the mobility of the volatile organic matters in the soil 2~7 cm deep from the surface layer. The scraped soil is stacked with the previously scraped soil for biodegradation and turned over in 1 to 2 days. Turn over the original biological heap, increase its air permeability and adjust its size to promote the volatilization of organic pollutants in the remaining soil. After the soil of the original biological heap has been completely scraped off, the new biological heap undergoes a biodegradation process. Adjust the moisture content and carbon-nitrogen ratio of the new biological heap so as to improve the ability of microorganisms to degrade organic matters.

EXAMPLE

The present invention is further described by specific examples below, but these examples are merely exemplary and do not constitute any limitation on the protection scope of the present invention.

Example 1

Follow these steps to implement organic polluted site remediation:
(1) Build a sunlight greenhouse with a size of 50×25 $m^2$, a height of 5 m, doors open on both sides, and the ground hardened. The sunlight greenhouse is composed of an air supporting membrane structure unit, a gas collection unit, an exhaust gas treatment unit and a detection unit. Wherein, the air supporting membrane structure unit is a steel structural frame, and the five-sided light-transmitting material uses glass fiber reinforced plastic. The gas collection unit is mainly composed of an induced draft fan and a gas collection pipe, the power is 5.5 kw and the air extraction volume is 7000 $m^3$/h. The exhaust gas treatment unit is arranged outside the greenhouse and is connected to the gas collection pipe of the gas collection unit, and includes a dust collector and an activated carbon adsorption device. The detection unit is arranged inside the greenhouse, specifically is a fixed PID detector and a wall-mounted flammable gas alarm, which monitors the concentration of indoor volatile organic pollutants in real time.
(2) Take 40 $m^3$ of polluted soil (moisture content 10%) with petroleum hydrocarbon pollutants concentration of 8000 mg/kg, sieve through a 2 mm sieve, dissolve cow dung (stacking time is 48 hours) and a microbial agent in water, both of which are added at 1.5% of the polluted soil by weight, and adjust the moisture content to 20%. Wherein, the microbial agent is prepared according to the following steps:

Take the contaminated groundwater of the polluted site and dilute it 10 times, $10^2$ times, $10^3$ times, $10^4$ times, and $10^5$ times, respectively. Place undiluted raw water and water diluted by the above multiples in different test tubes respectively, take 100 μL each of them and smear them on the plate culture medium, and then cultured in a 37° C. incubator until single large colonies that are clearly visible, regular edges, and large and round are grown. Take the single colonies and streak them on the slanted culture medium to obtain single colonies.

The single colonies cultured above are singled out and cultured in a seed culture medium. The components of said seed culture medium are: 50 g/L of soybean meal, 20 g/L of corn starch, 4 g/L of light calcium carbonate, 1 g/L of ammonium sulfate, and 2.5 g/L of corn slurry.

When the above-mentioned colonies are respectively cultured in a seed culture medium to an OD600 of 0.6 to 0.8, 1 mL is transferred to the fermentation medium. The components of said fermentation culture medium are: 90 g/L of soybean meal, 40 g/L of starch, 4 g/L of calcium carbonate, 0.7 g/L of ammonium sulfate, 10 g/L of peptone. Wherein, the fermentation culture medium further includes the contaminated groundwater of the site with a concentration of 20000 mg/L.

After the bacterial solution is cultured in the fermentation medium for a period of time, the content of the pollutants in the culture medium is measured, and the strain with the highest degradation rate of the pollutants is screened. The strain with the highest degradation rate obtained by screening is placed in a 50 L fermentor to expand the culture, the culture medium has the same components as the fermentation culture medium, but without adding the pollutants of the site, cultured at 15~20° C. for 30 h, and obtain said microbial agent.

(3) Turn over the polluted soil, microbial inoculant and cow dung with a turning-over machine, mix them evenly, stack them into two 20×1×1 $m^3$ strip shape mounds of soil, and place them in a sunlight greenhouse.

(4) Measure the average temperature per hour in the sunlight greenhouse. When the accumulated temperature in the sunlight greenhouse during the period of 8:00 to 20:00 is lower than 420° C., scrape the soil 5 cm deep from the surface of the original biological heap once every 2 to 3 days after sunset. When the accumulated temperature in the sunlight greenhouse during the period of 8:00 to 20:00 is higher than or equal to 420° C., scrape the soil 5 cm deep from the surface of the original biological heap once a day after sunset. Mix the scraped soil with the previously scraped soil to form another long biological heap, and use a large-scale mechanical spray to supplement water (using unpolluted water near the polluted site) to the scraped soil to a moisture content of 20%, and then turn over the biological heap with a turning-over machine.

When the concentration of volatile organic matters in the sunlight greenhouse reaches 100 ppm, the gas collection unit starts to operate.

Example 2

The method used in this example is similar to that in Example 1, except that in step (2), pig dung and a microbial agent are taken and dissolved in water, both of which are added at 1.0% of the weight of the polluted soil, and the moisture content is adjusted to 18%.

Example 3

The method used in this example is similar to that in Example 1, except that in step (2), urea and a microbial agent are taken and dissolved in water, both of which are added at 0.5% of the weight of the polluted soil, and the moisture content is adjusted to 30%.

Example 4

The method used in this example is similar to that in Example 1, except that in step (4), the scraped soil is watered (using unpolluted water near the polluted site) to a moisture content of 18%.

COMPARATIVE EXAMPLE

Comparative Example 1

The method used in this comparative example is similar to that in Example 1, except that in step (3), the biological heap is placed in the open air.

Comparative Example 2

The method used in this comparative example is similar to that in Example 1, except that in step (2), no microbial agent is added.

Comparative Example 3

The method used in this comparative example is similar to that in Example 1, except that in step (2), no cow dung is added.

Comparative Example 4

The method used in this comparative example is similar to that in Example 1, except that in step (2) and (3), rotten cow dung that has been stored for more than 3 months is added.

EXPERIMENTAL EXAMPLE

Experimental Example 1

The soils in example 1 and comparative example 1 were sampled on the 3rd, 7th, 17th, and 30th days after the soil pretreatment respectively, and the organic matter concentrations were tested by gas chromatography. The results are shown in FIG. 2.

Figure 2:
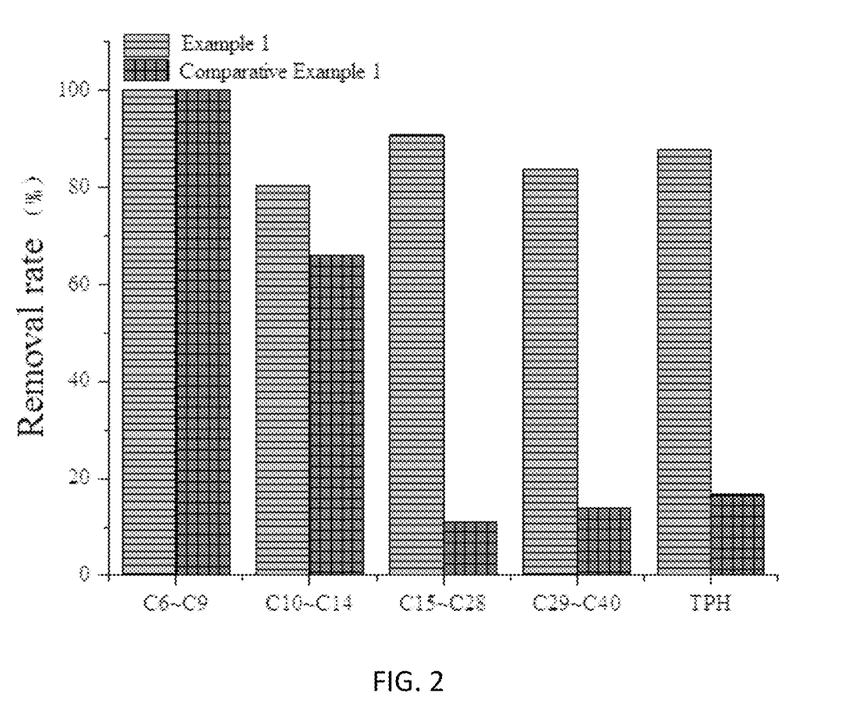
FIG. 2 shows the comparison result of the effects of the biological heap in Example 1 and Comparative Example 1 of the present invention.

It can be seen from FIG. 2 that after 30 days, in Example 1, the total petroleum hydrocarbon (TPH) removal rate of the biological heap in the sunlight greenhouse reaches 87.8%, the removal rate of C6~C9 (carbon chain length of petroleum hydrocarbons) reaches 100%, the removal rate of C10~C14 reaches 80.2%, the removal rate of C15~C28 reaches 90.8%, and the removal rate of C29~C40 reaches 83.7%; but in Comparative Example 1, the total petroleum hydrocarbon removal rate of the open-air biological heap is 25.3%, the removal rate of C6~C9 is 100%, the removal rate of C10~C14 is 60.3%, the removal rate of C15~C28 is 12%, and the removal rate of C29~C40 is 14%.

Obviously, the removal rate of organic pollutants by the biological heap in the sunlight greenhouse described in Example 1 of the present invention is significantly higher than that of the open-air biological heap in Comparative Example 1.

Experimental Example 2

The soils in example 1 and comparative example 2 and 3 were sampled on the 3rd, 7th, 17th, and 30th days after the soil pretreatment, and the organic matter concentrations were tested by gas chromatography. The results are shown in FIG. 3 and FIG. 4.

Figure 3:
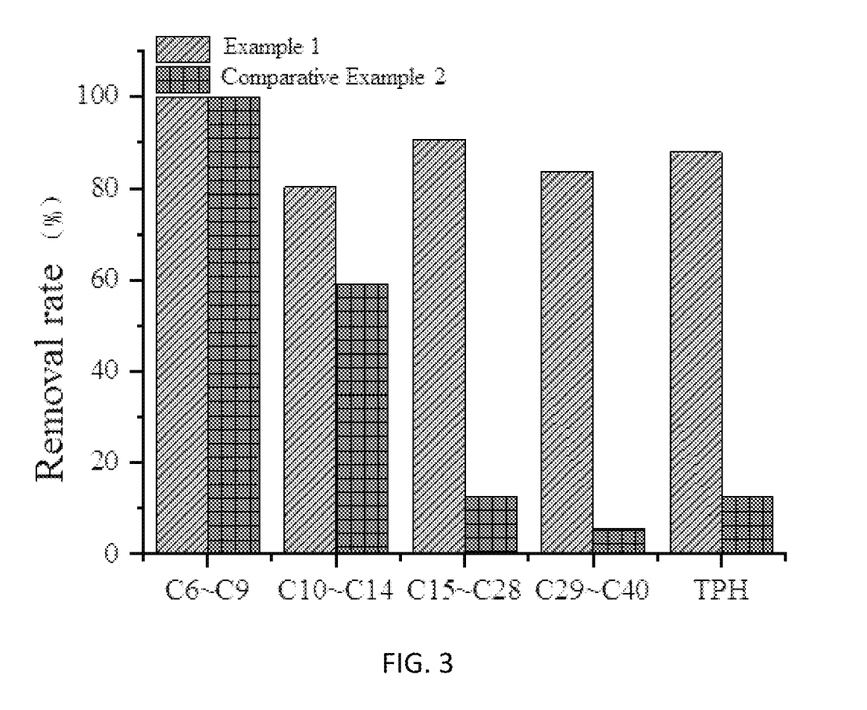
FIG. 3 shows the comparison result of the effects of the biological heap in Example 1 and Comparative Example 2 of the present invention.
Figure 4:
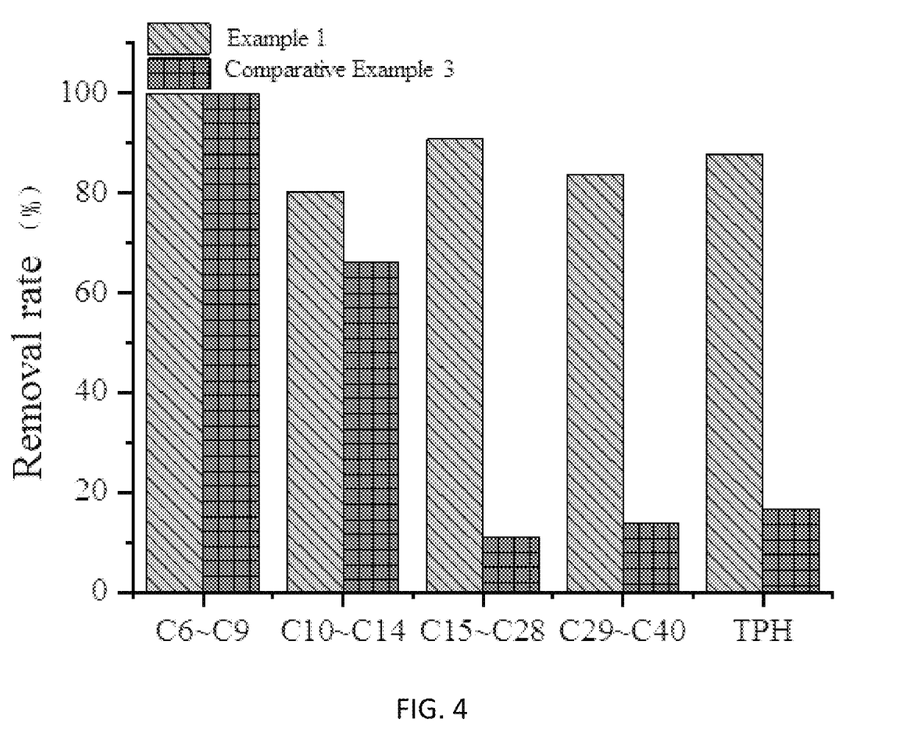
FIG. 4 shows the comparison result of the effects of the biological heap in Example 1 and Comparative Example 3 of the present invention.

It can be seen from FIG. 3 and FIG. 4 that after 30 days, in Example 1, the total petroleum hydrocarbon removal rate of the biological heap reaches 87.8%, the removal rate of C6~C9 reaches 100%, the removal rate of C10~C14 reaches 80.2%, the removal rate of C15~C28 reaches 90.8%, and the removal rate of C29~C40 reaches 83.7%.

In the biological heap with only a nutritional agent added in Comparative Example 2, the removal rate of C6~C9 is 100%, the removal rate of C10~C14 is 59.1%, the removal rate of C15~C28 is 12.7%, the removal rate of C29~C40 is 5.6%, and the total petroleum hydrocarbon removal rate is 12.54%;

In the biological heap with only a microbial agent added in Comparative Example 3, the removal rate of C6~C9 is 100%, the removal rate of C10~C14 is 66.4%, the removal rate of C15~C28 is 11.1%, the removal rate of C29~C40 is 13.9%, and the total petroleum hydrocarbon removal rate is 16.6%.

Obviously, in Example 1 of the present invention, the simultaneous addition of a microbial agent and a nutritional agent to the biological heap can significantly improve the removal rate of long-chain organic pollutants above C9 in the soil. Further, the temperature trends of the biological heap at different depths in Example 1, Comparative Example 2, and Comparative Example 3 over time were detected, and the results are shown in FIGS. 5-7, respectively.

Figure 5:
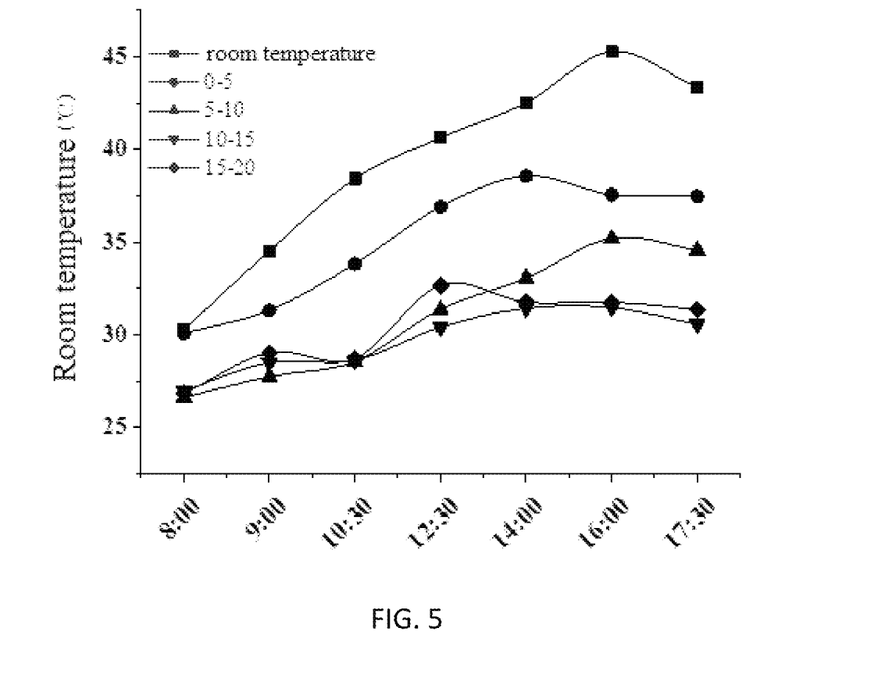
FIG. 5 shows the temperature change curves of the biological heap at different depths over time in Example 1 of the present invention.
Figure 6:
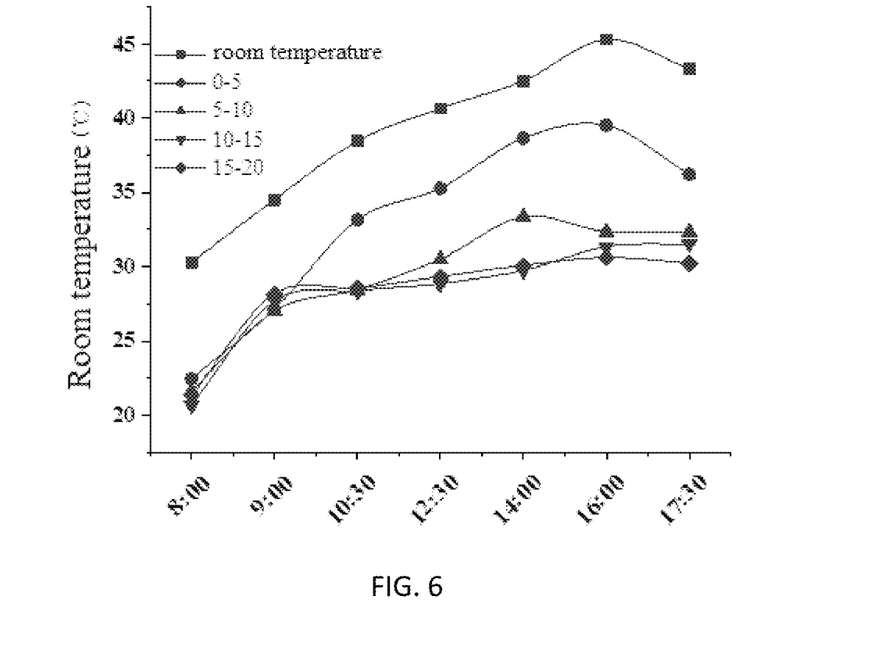
FIG. 6 shows the temperature change curves of the biological heap at different depths over time in Comparative Example 2 of the present invention.
Figure 7:
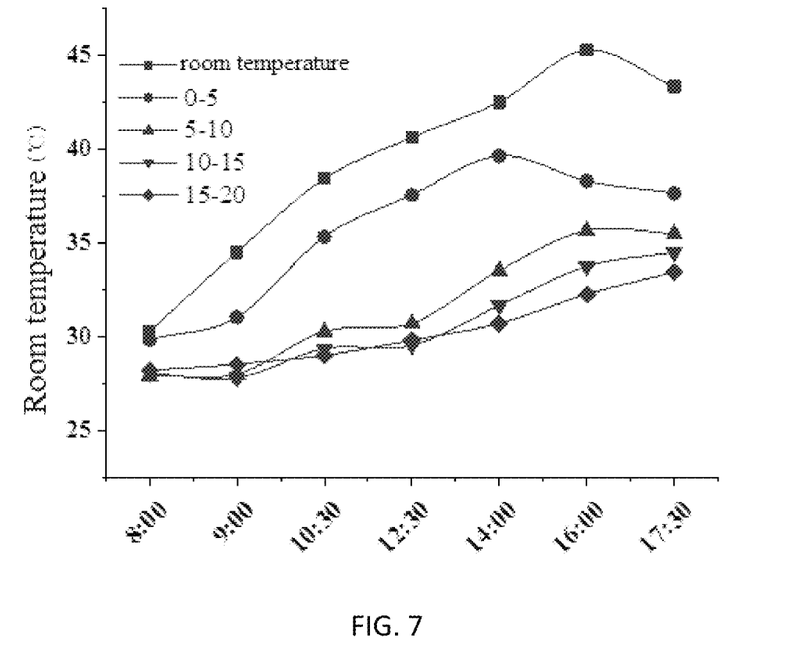
FIG. 7 shows the temperature change curves of the biological heap at different depths over time in Comparative Example 3 of the present invention.

It can be seen from FIG. 5 to FIG. 7 (wherein, in FIGS. 5 to 7, the curve "room temperature" represents the temperature of the air in the sunlight greenhouse; the curve "0-5" represents the soil temperature at a depth of 0 to 5 cm; the curve "5-10" represents the soil temperature at a depth of 5 to 10 cm; the curve "10-15" represents the soil temperature at a depth of 10 to 15 cm; the curve "15-20" represents the soil temperature at a depth of 15 to 20 cm) that the soil at a depth of 0 to 5 cm from the surface layer is greatly affected by the indoor temperature of the sunlight greenhouse. As the depth increases, the soil temperature decreases rapidly and does not change much. It can be seen that the soil temperature is the highest from 0 to 5 cm from the surface layer, the soil is the easiest to dry, and the organic matters is the most volatile. As the soil depth increases, the temperature is basically not affected by the temperature in the greenhouse, and the water is not easy to evaporate. There is water suitable for microbial life, and it is suitable for microbial degradation to remove petroleum hydrocarbon pollutants.

Experimental Example 3

Samples were taken from the soil in Example 1 and Comparative Example 4, and the Shannon index and species of microorganisms in the biological fermentation process of petroleum contaminated soil were statistically analyzed. The results are shown in FIG. 8 and FIG. 9, respectively.

Figure 8:
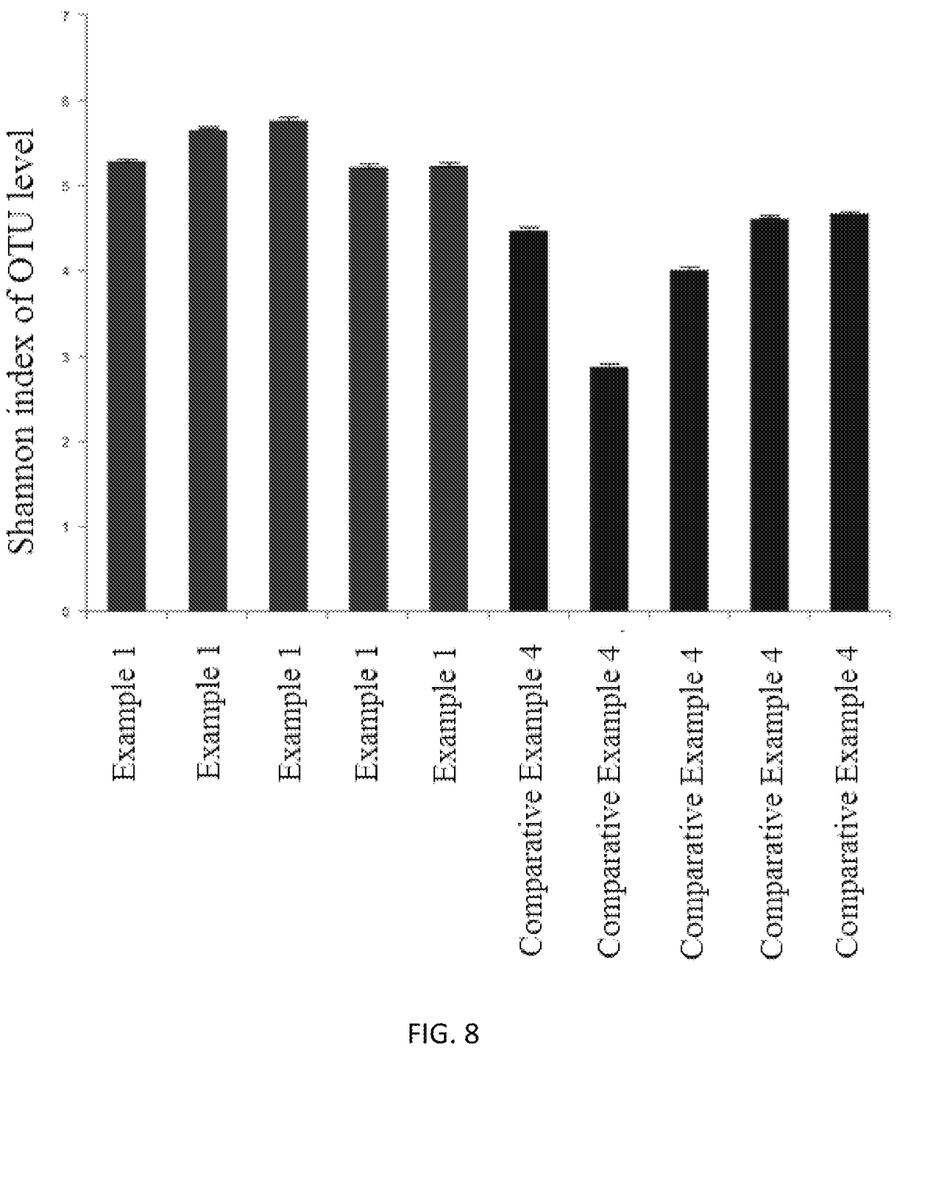
FIG. 8 shows the comparison result of microbial diversity in a biological fermentation process of petroleum-polluted soil in Example 1 and Comparative Example 4 of the present invention.
Figure 9:
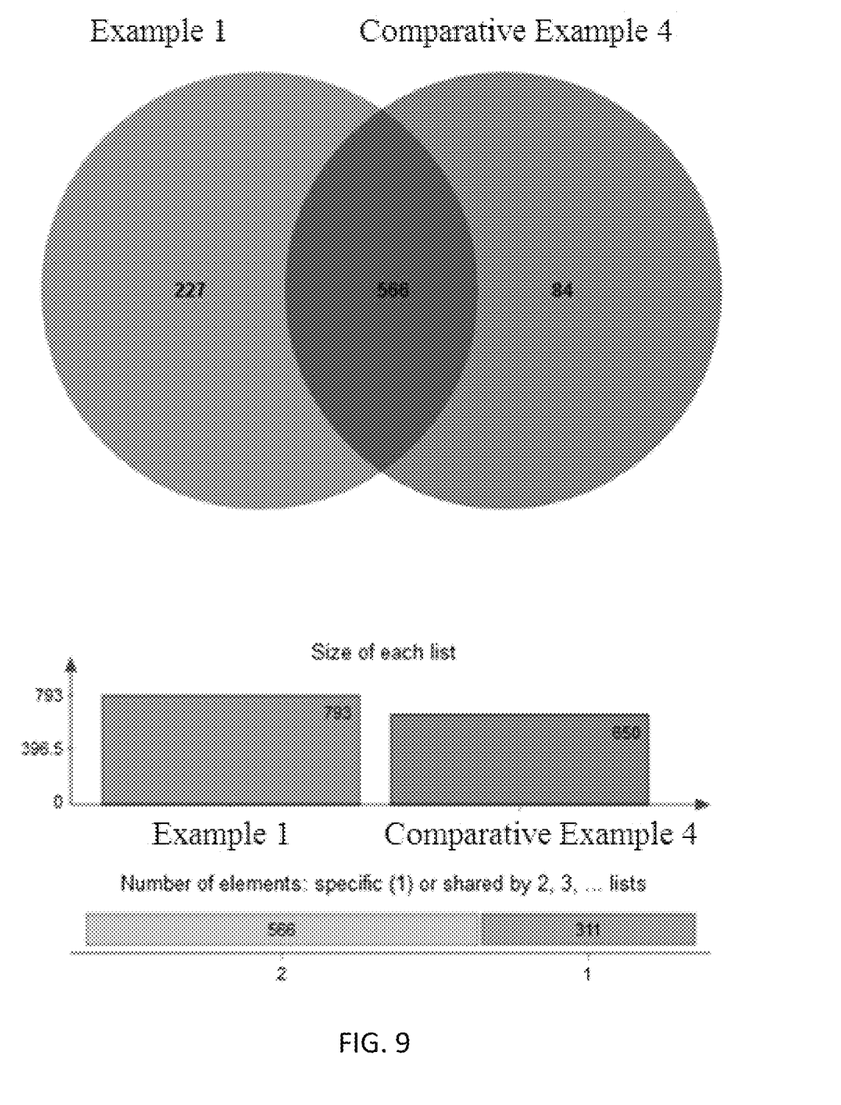
FIG. 9 shows the comparison result of micro-number in a biological fermentation process of petroleum-polluted soil in Example 1 and Comparative Example 4 of the present invention.

It can be seen from FIG. 8 and FIG. 9 that when the fresh cow dung with a stacking time of only 48 hours is added (Example 1), the Shannon index of the microorganisms is significantly higher than that of the adding rotten cow dung (Comparative Example 4) during the biological fermentation of the petroleum contaminated soil. The microbial species of fresh cow dung group (739 species) is also significantly higher than that of rotten cow dung group (650 species) in which the rotten cow dung is stacked for more than 3 months. From this, it can be seen that the use of fresh cow dung which has been stored for no more than 72 hours to the soil can increase the type and diversity of microorganisms in the biological heap, and improve its ability to degrade petroleum hydrocarbons.

The present invention has been described in detail with reference to specific embodiments and exemplary examples, but these descriptions should not be construed as limiting the present invention. Those skilled in the art should understand that, without departing from the spirit and scope of the present invention, various equivalent replacements, modifications, or improvements can be made to the technical solution and its implementation of the present invention, all of which fall within the scope of the present invention.

What is claimed is:

1. A method for repairing an organic polluted site, characterized in that, said method includes the following steps:
    step 1, build a sunlight greenhouse on the organic polluted site;
    step 2, pretreat soil of the organic polluted site by sieving, removing impurities, adjusting concentration of pollutants, and adding a pro-degradation agent;
    wherein impurities are weeds and stones;
    wherein the pro-degradation agent includes a microbial agent and a nutritional agent;
    said microbial agent with an ability of organic matter degradation that is screened from the soil of the organic polluted site; and said nutritional agent is animal feces and/or urea;
    step 3, perform a biological heap treatment on pretreated soil from step 2;
    step 4, implement quality control on the biological heap for soil remediation by scraping dried surface soil of the biological heap to generate a new biological heap, adjusting moisture content of the new biological heap with water and performing biological fermentation.

2. The method according to claim 1, characterized in that, in step 1, said sunlight greenhouse comprises a multi-sided transparent air supporting membrane structure unit (1) with a steel structure frame, a gas collection unit (2) and a detection unit (4) located inside the greenhouse, and an exhaust gas treatment unit (3) located outside the greenhouse.

3. The method according to claim 2, characterized in that, said gas collection unit (2) is disposed on the top of the inner wall of the air supporting membrane structure unit (1) to collect pollutants in the sunlight greenhouse.

4. The method according to claim 3, characterized in that, the gas collection unit is turned on for 0.5 to 1 hour every day during a period of 12:00 to 15:30 to suck out the volatile organic matters in the greenhouse and treated with activated carbon adsorption.

5. The method according to claim 1, characterized in that, the concentration of the pollutants in the soil to is below 60,000 mg/kg.

6. The method according to claim 1,
    wherein the stacking time of said animal feces is less than 72 hours.

7. The method according to claim 6, characterized in that, ratio of the soil of the organic polluted site, the microbial agent and the nutritional agent is 100, 0.3-2 and 0.4-1.8 by weight, respectively.

8. The method according to claim 1, characterized in that, in step 2, further pretreat the soil of the organic polluted site by adjusting moisture content of the soil.

9. The method according to claim 1, characterized in that, in step 4, said quality control includes the following steps:
  step 4-1, scrape the dried surface soil of the biological heap every 1~3 days to generate the new biological heap;
  step 4-2, add water for adjusting the moisture content of the new biological heap to be saturated for holding capacity of the soil, and perform biological fermentation;
  scrape the surface soil of the original biological heap once a day when accumulated temperature in the sunlight greenhouse from 8:00 to 20:00 is higher than or equal to 420° C.

10. The method according to claim 4, characterized in that, the gas collection unit is turned on for 0.5 to 1 hour every day during a period of 13:00 to 14:00 to suck out the volatile organic matters in the greenhouse and treated with activated carbon adsorption.

11. The method according to claim 9, characterized in that, scrape the surface soil of the original biological heap every 2 to 3 days when the accumulated temperature in the sunlight greenhouse from 8:00 to 20:00 is lower than 420° C.

* * * * *